United States Patent Office 2,714,373
Patented Aug. 2, 1955

2,714,373

AIR COOLED COMPRESSION-IGNITION ENGINE AND INJECTOR THEREFOR

Ernst Wilhelm Spannhake, Chicago Heights, Ill., assignor to Barnes & Reinecke, Inc., Chicago, Ill., a corporation of Delaware Application January 30, 1951, Serial No. 208,571

2 Claims. (Cl. 123—41.31)

My invention relates to an improved air cooled compression-ignition engine capable of operating with air cooling without overheating or exhibiting undue tendency to form deposits of residue material on the operating parts.

Compression-ignition engines, or diesel engines, are characterized by ability to operate effectively on relatively heavy, inexpensive, and non-explosive fuels and by high thermal efficiencies. However, application of these engines has heretofore been confined to installations where water has been available for cooling purposes and the weight of the water and the necessary water-handling equipment can be tolerated. However, in applications where water is not available, or where the weight of the cooling water and associated water-handling equipment is intolerable, the compression-ignition engine, despite its other advantages, has not been extensively used and other forms of power, especially the air cooled gasoline engine have been usually applied.

Because of the demand for an air cooled compression-ignition engine, numerous efforts have been made to construct such an engine. These efforts have been directed to the problem of removing heat from the cylinder itself, and despite the theoretical effectiveness of many of the measures, such as cooling fins, provided for this purpose, maintenance and other difficulties have been experienced and commercially practical air cooled engines have only been achieved on lightly loaded engines.

I have found that the air cooled compression-ignition engines heretofore available have limited capacity because the cooling system, while capable of removing the requisite heat from the engine as a whole, is incapable of keeping all the engine parts uniformly below their critical maximum operating temperatures. As a consequence, some parts of the engine, such as cylinder walls, pistons, and the like are well below their respective maximum operating temperatures while other parts particularly the injection valves, have reached or exceeded the maximum operating temperatures they can tolerate. As a consequence, measures that merely increase the total flow of coolant air are of very limited aid in increasing engine output, especially since the required power can easily become substantial.

The injection nozzle, I have found, is a particularly critical element from the standpoint of cooling and, in the absence of special measures directed to increasing the heat flow from it, rapidly rises to an intolerable temperature. This is due in part to its location at a point close to the zone of combustion and in part to the fact that the injection nozzle has numerous close-tolerance relatively moving lapped surfaces which readily warp or bind upon heating and correspondingly prevent it from operating successfully at temperatures which can still be tolerated by the operating parts of the engine.

In accordance with the present invention, an air cooled compression-ignition engine is made possible without the maintenance and other difficulties and low power output that have heretofore been associated with such engines. Briefly, the engine of the present invention incorporates the usual cooling air passage in the spaces surrounding the cylinder head in thermal proximity to the cylinder and adapted to receive a flow of cooling air. This passage has a plurality of parallel cooling fins aligned with the direction of air flow. In the structure of the present invention, these fins define a cylindrical opening which is in registry with a smaller fuel inlet opening leading to the cylinder. The injection nozzle fits in these openings and has a headed portion with disk-like fins, which are received in the cylindrical opening and are subject to the longitudinal cooling air flow. This headed portion has sufficient heat contact with the portions of the nozzle closest to its tip to enable vigorous heat flow out of this tip into the fins. It has been found that this construction, coupled with means (such as fins) to cool the other parts of the structure, provides an air cooled compression-ignition engine having an effective distribution of cooling which operates much like the conventional liquid cooled engine and does not entail the disadvantages associated with liquid cooling.

It is therefore a general object of the present invention to provide an improved compression-ignition engine capable of operating effectively with air cooling.

Another object of the present invention is to provide an improved compression-ignition engine capable of operating with air cooling in an efficient manner, without excessive shutdown time, and at a relatively large loading.

Still another object of the present invention is to provide an improved air cooled compression engine wherein the available cooling air is so distributed as to cool all working parts as required to keep them uniformly below their respective safe operating temperatures.

Yet another object of the present invention is to provide an improved air cooled compression-ignition engine which may be inexpensively and easily manufactured.

It is an additional object of the present invention to provide an improved compression-ignition engine and injector valve therefor wherein vigorous heat flow from the nozzle seat to the cooling fins is provided, the heat flow path being displaced from the movable seating parts of the injector.

The novel features which I believe to be characteristic of my invention are set forth with particularity in the appended claims. My invention itself, however, both as to its construction and method of operation, together with further objects and advantages thereof, may best be understood by reference to the following description taken in conjunction with the accompanying drawings, in which:

Figure 1:
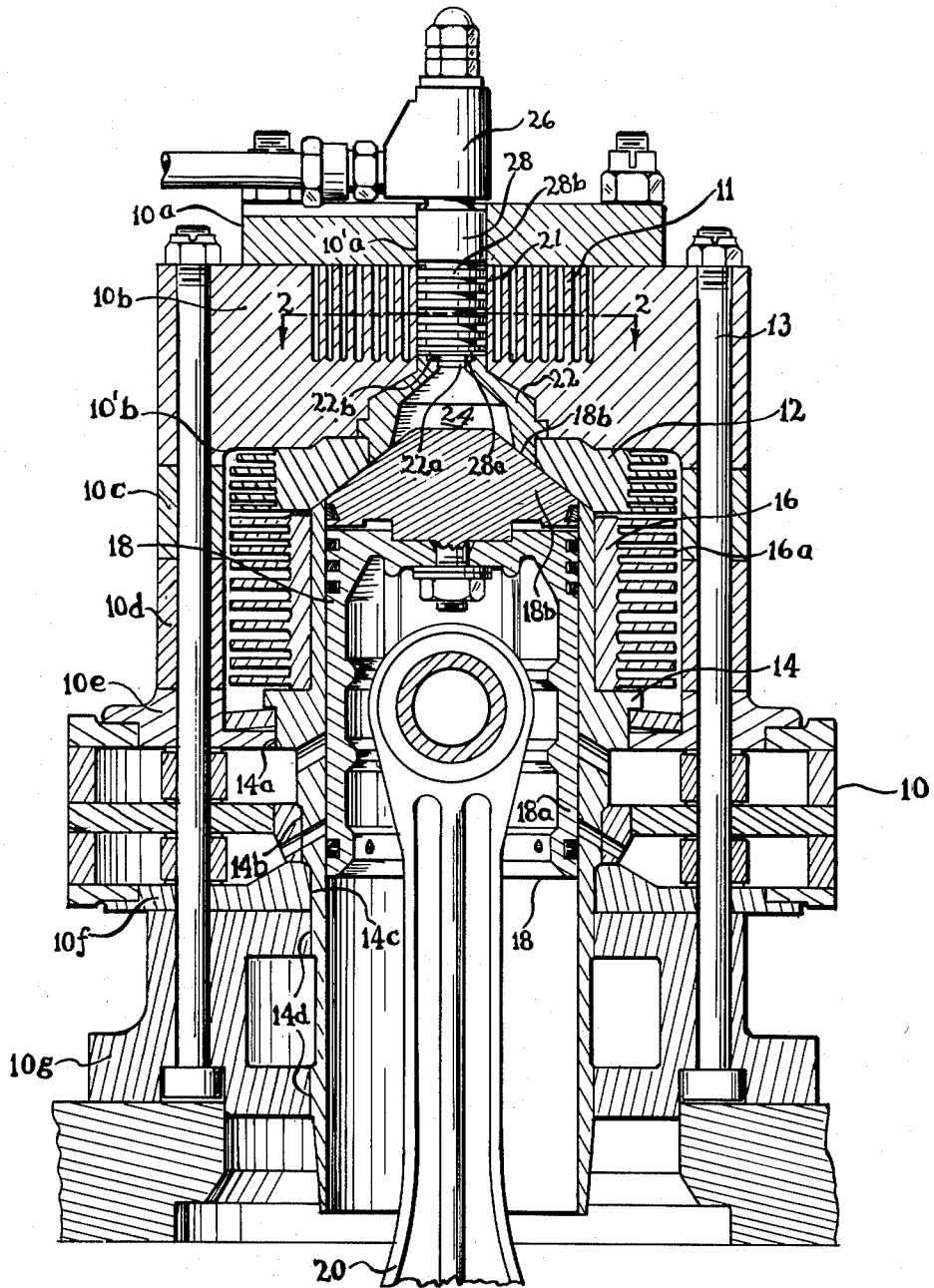
Figure 1 is a fragmentary cross-sectional view of an internal combustion engine constructed in accordance with the principles of the present invention with parts in elevation.

Referring now to Figure 1, there is shown at 10 a cylinder head formed by a plurality of sandwiched mating parts 10a, 10b, 10c, 10d, 10e, 10f, and 10g held together by the tension bolts 13. Part 10b has a cup-shaped surface 10'b in which the mating finned liner disk 12 is fitted. Parts 10e, 10f, and 10g snugly receive the cylinder liner 14 which at portions 14a, 14b, 14c, and 14d fits in these parts. At its upper portions the cylinder liner 14 carries the finned sleeve 16 which has fins 16a extending radially outwardly to positions almost touching the inner periphery of members 10c and 10d. Thus sleeve 16 and liner disk 12 form finned channels in conjunction with parts 10b, 10c and 10d.

A piston 18 is received in the liner 14 for up and down reciprocating movements. It is connected by the piston rod 20 in the conventional manner to a suitable crankshaft (not shown) to execute reciprocating motions as the crankshaft rotates. The piston is composed of a main skirt-defining portion 18a and a conical cap portion 18b secured thereto. The conformation of the cap portion corresponds with the shape of the liner 12 to define a minimum residual volume in connection with that liner when the piston is in the upper dead center position.

The head-defining part 10b has a centrally disposed rather deep cup-shaped opening which receives the liner 22 which on its interior face is of somewhat spherical configuration to define a chamber 24 into which fuel is periodically injected. The top of the chamber 24 has an opening 22a which receives the fuel injection nozzle and through which fuel is injected during engine operation.

The top face of the part 10b is cut longitudinally in its center portions in a series of grooves to define the fins 11 which extend down to approximately the top of the liner 22. These fins are cut out to form an enlarged circular bore 21 in the regions in registry with the passage 22a, thus forming an enlarged opening in registry with the fuel inlet opening. The part 10a has a like bore 10'a.

The injection nozzle is generally indicated at 26 and fits into the bore 10'a and the bore formed by the fins 11 as shown in the figures. The tip of the nozzle defines an annular face 28a which fits on the seat 22b in registry with the passage 22a.

The head member 28 of the injection nozzle consists of a sleeve made of duraluminum, steel, copper or other material of sufficient heat conductivity and strength and has at its lower portions a series of annular or peripheral fins 28b. As shown in Figure 1, these fins have the same extent as the fins 11 of the member 10b and are in registry with fins 11. Consequently, the fins 28b form a continuation of the finned channel defined by parts 10a and 10b and this channel is only obstructed by the solid center portion of the injection nozzle.

As can be seen clearly in Fig. 1 of the drawing, part or more specifically, plate 10a provides a cover or closure for the top of the longitudinally-extending air passages between fins 11. Further, the upper portion of sleeve 28 is snugly received within bore 10'a. This construction and relationship of plate 10a to sleeve 28 and fins 11 is important for achieving a completely forced flow of air through fins 11 and 28b and thereby producing a substantially uniform air velocity over the fins. However, the details of the construction illustrated can be varied, since in general the desired results can be achieved by employing closure means extending over the top of the cylinder head fins such as fins 11 and confining any air passing over these fins to the spaces between the fins.

Figure 3:
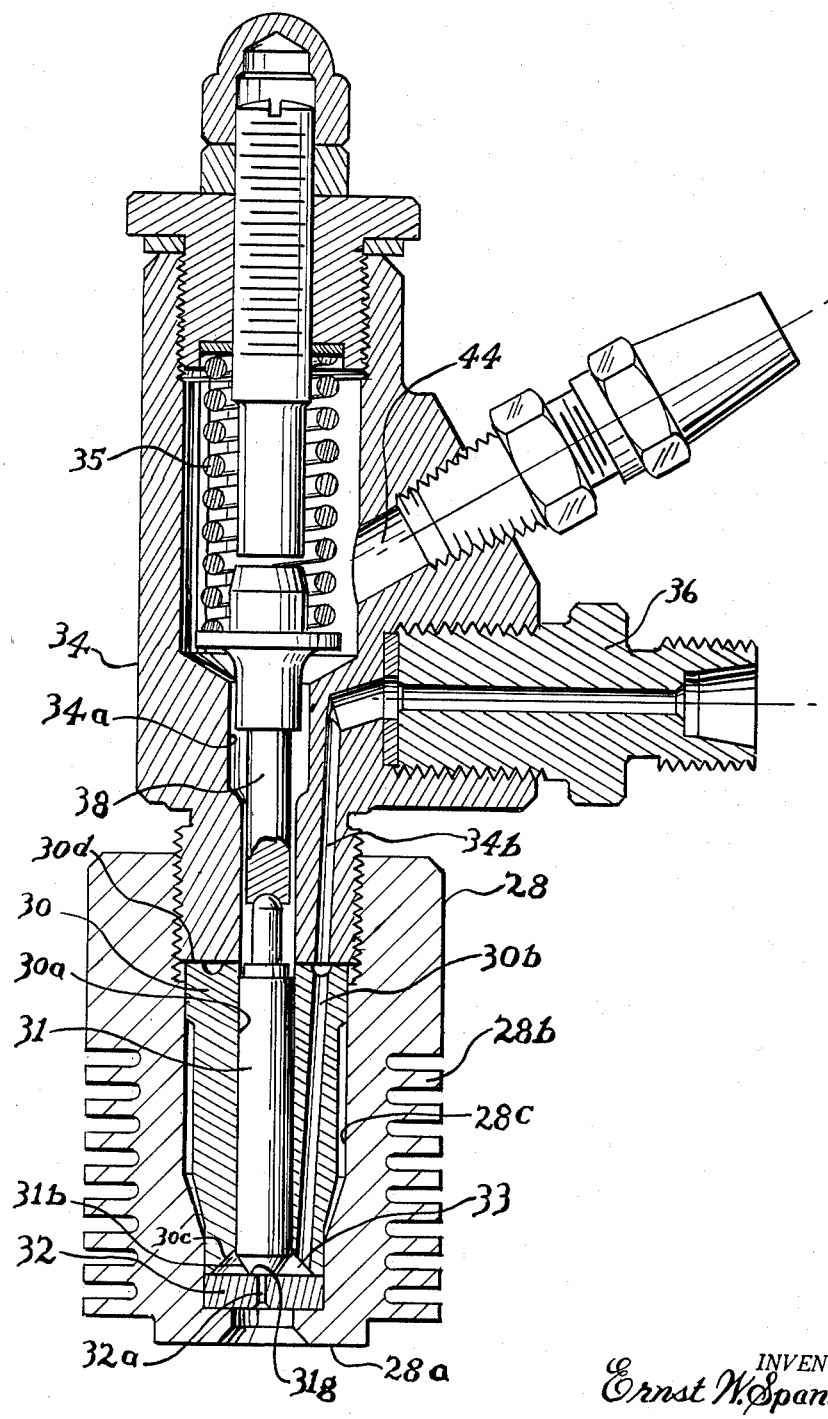
Figure 3 is an enlarged fragmentary axial cross-sectional view of the injector nozzle of the present invention.

As shown in Figure 3, the sleeve 28 has a longitudinal bore 28c which receives the nozzle body 30 of the injection nozzle assembly which seats at its bottom end against the plate 32 defining one or more fuel injection openings 32a. Nozzle body 30 carries a bore 30a in which is guided valve needle 31 which together with plate 32, forms the valve seat 31g. It also carries an eccentrically disposed channel 30b in communication with pressure ring space 33 formed between the beveled portion 31b of the needle and the beveled walls 30c.

The nozzle body 30 is pressed against the nozzle holder body 34 along its upper face 30d by nozzle plate 32 which in turn is pressed by sleeve 28. Sleeve 28 is threadedly fixed to nozzle holder 34. This body member has a channel 34b in registry with the channel 30b. Needle 31 is in communication with stem 38 located in bore 34a. Spring means 35 are provided to force stem 38 and needle 31 downward thus closing valve seat 31g.

The open end of channel 34b receives the nipple 36 which is connected to a fuel supply pump (not shown) in the conventional manner. This pump delivers fuel to the channel 34b periodically and under pressure to force the same into the pressure ring space 33 to lift needle 31 off its seat and admit it through channels 32a and 22a (Figure 1) into the cylinder.

Channel 44 forms an escape channel for fuel oil entering bore 34a.

Figure 2:
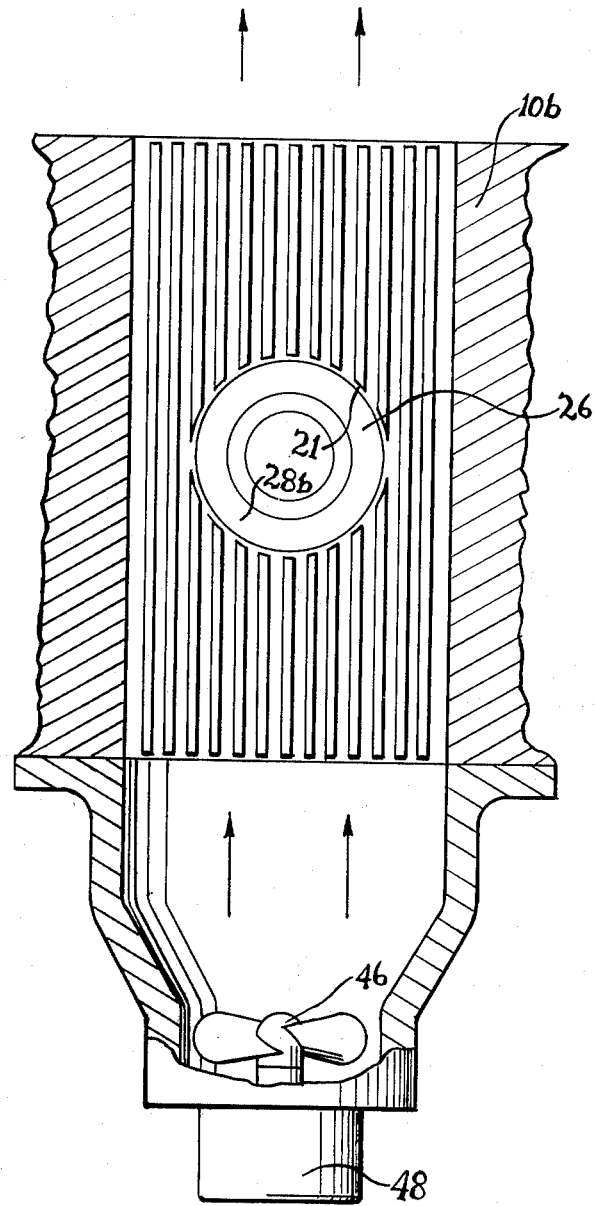
Figure 2 is a fragmentary cross-sectional view through axis 2—2, Figure 1.

The finned channel defined by parts 10a and 10b extends transversely across the cylinder head as shown in Figure 2. Suitable means, such as a fan 46 driven by motor 48, is provided to force cooling air through this channel.

In order to provide the optimum injection valve cooling in relation to the cooling of the other parts of the engine, it is desirable to space the fins 28b fairly closely in conjunction with using as thin fins as can practically be used. It is also desirable to proportion the spacing of the main cylinder cooling fins so that at least three or four fins are spanned by the injection cylinder cooling fins, thereby minimizing the variations in air flow between the adjacent channels defined by the main cooling fins.

Effective operation of the injection cylinder is also promoted by providing a unit wherein the area of pressure contact 28a is as small as possible so that a minimum heat flow occurs across this contact and in which the cooling fins 28b are as close as possible to this area of pressure contact. Moreover, it is desirable to so arrange the peripheral fins 28b that the heat flow path between them and the area 28a is as remote as possible from the valve needle 31 and the nozzle body 30, thereby minimizing the tendency of these parts to partake of the high temperatures at surface 28a.

The desired diversion of heat flow away from valve needle 31 is also made more positive in the structure shown, as seen more clearly in Fig. 3, by the provision of a space or air gap between nozzle body 30 and sleeve 28. Preferably, as shown, sleeve 28 is spaced from nozzle body 30 for a substantial length thereof to promote the flow of heat to sleeve fins 28b instead of into body 30.

In an actual compression-ignition engine, of proportions generally as shown in the figures, the following construction was used:

| | |
|---|---|
| Liner 22 | having a cavity 24 of 1⅞" maximum diameter |
| Opening 22a | upper diameter ½" beveled to ¾" maximum diameter |
| Fins 28b | 1.368" diameter x 1/16" thickness |
| Head 28 | 1.368 O. D., 1¾" long |
| Fins 11 | 1 3/16" deep, 1/16" thickness, formed unitarily with part 10b which is of aluminum |
| Cylinder bore | 3⅝" |
| Piston stroke | 4¾" |

With the engine above described it has been found possible to operate at a power output of as much as 0.57 horsepower per cubic inch of displacement, with high efficiency and without the use of any cooling other than air flow requiring less than 2 per cent of the engine output. Operation has been achieved at speeds from 600 to 2400 R. P. M. and power outputs up to 28 horsepower per cylinder. The engine operated 1242 hours at 1500 R. P. M. and 25 horsepower per cylinder without shutdown for repairs or cleaning. Not once during this entire operation was there an engine failure due to valve sticking, excessive carbon deposit, or other cause attributable to overheating.

Figure 4:
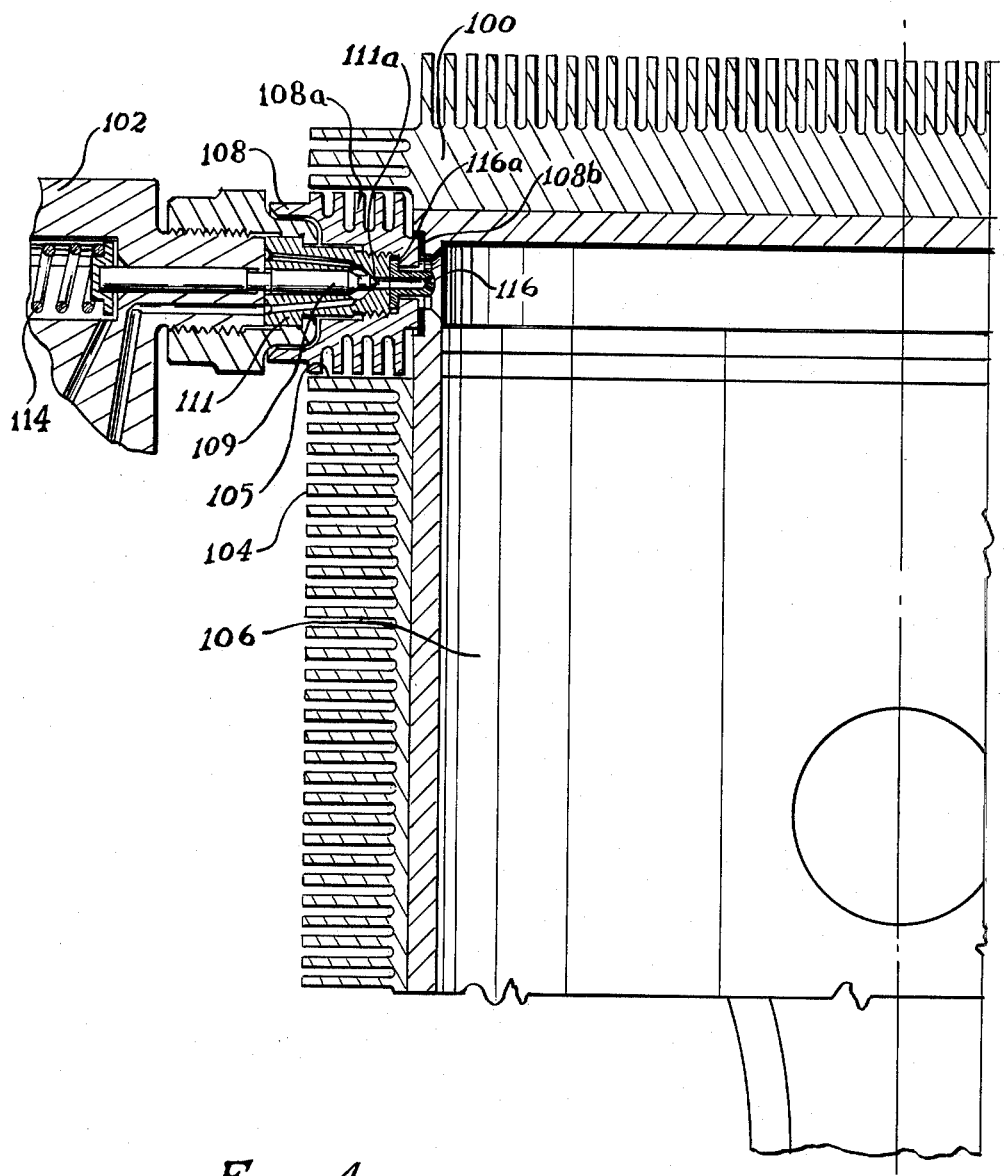
Figure 4 is a fragmentary cross-sectional view like Figure 3 through the injection nozzle and adjacent mechanism of a compression-ignition engine constructed in accordance with an alternate embodiment of the present invention.

The above description and example represents merely one illustrative embodiment of the present invention and others may readily be made without departing from the spirit and scope thereof. For example, as shown in Figure 4, the engine may be of the side valve type wherein the injection nozzle 102 is located at the side of the cylinder head 100 to inject fuel laterally of the motion of the piston 106. In this form of the invention the parallel fins 104 at the side of the cylinder are bored out to form a cylindrical cavity 105 which receives the disk-like fins 108a of the injection nozzle 102 so that the cooling air travels about the feed portion of the nozzle as it travels along the side fins.

In the structure of Figure 4 there is shown by way of example a nozzle having a conical seat 111a in its nozzle body 111 for the admission of fuel into the engine cylinder under pressure, the pressure lifting needle 109 against spring means 114 in like manner as indicated in Figure 3. Contact of the finned sleeve 108 with portions of the nozzle near the tip is achieved by orifice button 116 which is pressed firmly against nozzle body 111 by reason of the threaded engagement of this member and nozzle body 111. The annular seating face 108b of fin member 108 is thus brought in good heat conducting contact with face 116a of orifice button 116.

Moreover, the engine of the present invention can be easily manufactured without special tools, since the fins 11 can first be cut on a milling machine or similar tool and the finned portion then cut out in a bore to receive the injection nozzle 26. The injection nozzle can readily be manufactured with the fins 28b as these may be formed in the member 28 by turning on a lathe.

While I have shown and described a specific embodiment of the present invention, it will of course be understood that I do not wish to be limited thereto and that by the appended claims I intend to cover all modifications and alternative constructions falling within the true spirit and scope thereof.

What I claim as new and desire to secure by Letters Patent of the United States is:

1. In an air cooled compression-ignition engine the improvement comprising, a body defining a cylinder having a fuel inlet passage and an annular seat surrounding the same, the body having a plurality of parallel cooling fins extending outwardly from its surface in the area near the passage, the fins each terminating at substantially the same radial distance from the passage to define a cylindrical space, and an injection nozzle received in the space, the injection nozzle having a sleeve portion with a cavity and a port extending from the cavity to said fuel inlet passage, and a plurality of peripheral fins essentially at right angles to the planes of the first mentioned fins and coextensive with the cylindrical space, the body portion of the injection nozzle seating snugly against said annular seat and defining a good heat conducting path from said seat away from the cylinder and radially outwardly in relation to the port and to the cavity, the injection nozzle further having an injection plunger operative to seat against the cavity in the region of the port and generally displaced from said good heat conducting path.

2. In an air cooled compression-ignition engine, the improvement comprising a body providing a cylinder having a fuel inlet passage extending through said body from the outside thereof into said cylinder, said passage being equipped with an injection nozzle seat about the outer end thereof, the body having a plurality of cooling fins extending outwardly from its outer surface in the area near said passage, said fins being arranged to provide an opening aligned with said injection nozzle seat, an injection nozzle received in said opening and projecting outwardly therefrom, said nozzle having a sleeve about its inner end seating snugly against said injection nozzle seat and providing a good heat conducting path outwardly from the cylinder into the sleeve, said injection nozzle having a nozzle body within said sleeve providing a bore for receiving a valve needle and said sleeve also having a plurality of outwardly-extending cooling fins adjacent said injection nozzle seat and about said valve needle receiving bore, a substantial length of said sleeve being spaced from said nozzle body to promote the flow of heat to said sleeve fins instead of into said nozzle body, and means for directing cooling air over said first and second-mentioned fins.

References Cited in the file of this patent

UNITED STATES PATENTS

| | | |
|---|---|---|
| 1,997,173 | Gosslau et al. | Apr. 9, 1935 |
| 2,025,506 | Gosslau | Dec. 24, 1935 |
| 2,043,531 | Dorman | June 9, 1936 |
| 2,075,911 | Roth | Apr. 6, 1937 |
| 2,270,990 | Bachle | Jan. 27, 1942 |
| 2,398,191 | Rosen et al. | Apr. 9, 1946 |
| 2,438,669 | Krenzke | Mar. 30, 1948 |
| 2,533,487 | Maurer et al. | Dec. 12, 1950 |

FOREIGN PATENTS

| | | |
|---|---|---|
| 801,913 | France | May 30, 1936 |
| 854,361 | France | Jan. 15, 1940 |
| 223,382 | Switzerland | Dec. 1, 1942 |